(12) United States Patent
Morita et al.

(10) Patent No.: US 8,117,829 B2
(45) Date of Patent: Feb. 21, 2012

(54) EXHAUST EMISSION CONTROL DEVICE AND METHOD FOR INTERNAL COMBUSTION ENGINE, AND ENGINE CONTROL UNIT

(75) Inventors: Tomoko Morita, Saitama-ken (JP); Norio Suzuki, Saitama-ken (JP); Takashi Konomoto, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1034 days.

(21) Appl. No.: 11/942,039

(22) Filed: Nov. 19, 2007

(65) Prior Publication Data
US 2008/0120965 A1    May 29, 2008

(30) Foreign Application Priority Data
Nov. 24, 2006   (JP) .................................. 2006-317855

(51) Int. Cl.
*F01N 3/00*   (2006.01)
(52) U.S. Cl. ................ 60/277; 60/274; 60/276; 60/286; 60/295; 60/301
(58) Field of Classification Search ............... 60/274, 60/276, 277, 286, 295, 301
See application file for complete search history.

(56) References Cited

U.S. PATENT DOCUMENTS

| | | | | |
|---|---|---|---|---|
| 5,201,802 A * | 4/1993 | Hirota et al. | ..................... | 60/276 |
| 5,426,937 A * | 6/1995 | Ohuchi et al. | .................. | 60/276 |
| 6,718,756 B1 * | 4/2004 | Okada et al. | ..................... | 60/286 |
| 6,915,628 B2 * | 7/2005 | Kamoto et al. | ................. | 60/277 |

FOREIGN PATENT DOCUMENTS

| | | | |
|---|---|---|---|
| DE | 19918875 | * | 10/1999 |
| JP | 03-050315 A | | 3/1991 |
| JP | 11-311142 A | | 11/1999 |

\* cited by examiner

*Primary Examiner* — Thomas Denion
*Assistant Examiner* — Diem Tran
(74) *Attorney, Agent, or Firm* — Arent Fox, LLP

(57) ABSTRACT

An exhaust emission control device for an internal combustion engine which is capable of supplying a just enough amount of reducing agent to a NOx catalyst while causing the consumption amount of reducing agent dependent on the degradation degree of an upstream catalyst to be reflected thereon. A NOx catalyst is disposed at a location downstream of a catalyst having an oxidation function for purifying exhaust gases, for trapping NOx contained in exhaust gases in an oxidizing atmosphere, and reducing the trapped NOx in a reducing atmosphere to thereby purify the trapped NOx. Exhaust gases flowing into the NOx catalyst are controlled to the reducing atmosphere, by supplying reducing agent to an upstream side of the catalyst. The degradation degree of the catalyst is estimated, and a time period over which the reduction control should be executed is corrected according to the estimated degradation degree.

12 Claims, 12 Drawing Sheets

EXHAUST EMISSION CONTROL DEVICE AND METHOD FOR INTERNAL COMBUSTION ENGINE, AND ENGINE CONTROL UNIT

CROSS REFERENCE TO RELATED APPLICATION

This application claims the priority of Japanese Application No. 317855/2006, filed Nov. 24, 2006 the entire specification, claims and drawings of which are incorporated herewith by reference.

BACKGROUND OF THE INVENTION

1. Field of the Invention

The present invention relates to an exhaust emission control device and method for an internal combustion engine, and an engine control unit, for purifying i.e. decreasing exhaust emissions by temporarily trapping NOx contained in exhaust gases discharged from the engine and performing reduction of the trapped NOx.

2. Description of the Related Art

Conventionally, there has been disclosed an exhaust emission control device for an internal combustion engine, e.g. in Japanese Laid-Open Patent Publication (Kokai) No. 2006-207487. This internal combustion engine is a diesel engine in which a three-way catalyst and a NOx catalyst are disposed in an exhaust pipe thereof from the upstream side in the mentioned order, for purifying HC and CO mainly during low temperature, and for eliminating harmful NOx ingredients, i.e. purifying NOx, respectively. In this exhaust emission control device, exhaust gases discharged from the engine during lean operation thereof pass through the three-way catalyst and then flow into the NOx catalyst, wherein NOx in the exhaust gases is trapped.

When the amount of trapped NOx reaches a predetermined value, rich spike is executed to cause the air-fuel ratio of a mixture supplied to the engine is controlled to a richer side than a stoichiometric air-fuel ratio. The rich spike causes unburned fuel components in the exhaust gases to be supplied to the NOx catalyst as reducing agent, whereby the NOx trapped in the NOx catalyst is reduced to be purified, i.e. changed into harmless ingredients. Further, the reducing agent supply amount indicative of the amount of reducing agent supplied to the NOx catalyst is calculated based on the detected air-fuel ratio detected by an air-fuel ratio sensor disposed at a location upstream of the three-way catalyst, the space velocity of exhaust gases, etc., and when the cumulative value of the reducing agent supply amount exceeds a threshold value set according to the trapped NOx amount, it is judged that the reduction of NOx is complete, so that the rich spike is terminated.

As described above, according to this exhaust emission control device, since the three-way catalyst is disposed upstream of the NOx catalyst, the reducing agent supplied by rich spike is consumed to some extent in the three-way catalyst, and is then supplied to the NOx catalyst. Specifically, in the three-way catalyst, reducing agent is oxidized and consumed by oxygen stored therein before the start of the rich spike, and hence the amount of reducing agent actually supplied to the NO catalyst becomes smaller accordingly. Further, the consumption amount of reducing agent varies with the degree of degradation of the three-way catalyst, and as the degree of degradation is higher, the oxygen storage capability and oxidation capability are lowered, and hence the consumption amount of reducing agent is reduced.

In the conventional exhaust emission control devices, however, the facts that reducing agent is consumed in the three-way catalyst, and that the reducing agent consumption amount varies with the degree of degradation of the three-way catalyst are not taken into consideration at all, but the amount of reducing agent supplied to the NOx catalyst is only calculated based on the detected air-fuel ratio of exhaust gases upstream of the three-way catalyst, etc. For this reason, when the amount of reducing agent consumed in the three-way catalyst is large, the amount of reducing agent supplied to the NOx catalyst is calculated to be larger than the actual amount, so that the cumulative value of the reducing agent supply amount exceeds the threshold value before the reduction of NOx is not actually complete to terminate the rich spike. This increases exhaust emissions due to insufficient reduction of NOx. Inversely, when the amount of reducing agent consumed in the three-way catalyst is small, the timing for termination of the rich spike becomes late than it should be, which causes an excessive supply of reducing agent. This causes excess amounts of CO and HC to be generated, resulting in increased exhaust emissions and degraded fuel economy.

SUMMARY OF THE INVENTION

It is an object of the present invention to provide an exhaust emission control device and method for an internal combustion engine, and an engine control unit, which is capable of supplying a just enough amount of reducing agent to a NOx catalyst while causing the consumption amount of reducing agent dependent on the degree of degradation of an upstream catalyst to be reflected thereon, to thereby reduce exhaust emissions and improve fuel economy.

To attain the above object, in a first aspect of the present invention, there is provided an exhaust emission control device for an internal combustion engine, for purifying exhaust gases discharged from the engine into an exhaust system, comprising a catalyst that is disposed in the exhaust system and has an oxidation function for purifying exhaust gases, a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, NOx reduction control means for executing reduction control in which the exhaust gases flowing into the NOx catalyst are controlled to the reducing atmosphere, by supplying reducing agent to an upstream side of the catalyst so as to cause the NOx catalyst to carry out an operation for reducing NOx, degradation degree-estimating means for estimating a degree of degradation of the catalyst, and correction means for correcting a time period over which the reduction control should be executed by the NOx reduction control means, according to the estimated degree of degradation of the catalyst.

With the configuration of this exhaust emission control device, a catalyst having an oxidation function and a NOx catalyst are disposed in the exhaust system of the engine, from the upstream side in the mentioned order. NOx in exhaust gases discharged from the engine is trapped in the NOx catalyst in an oxidizing atmosphere, Further, NOx reduction control means supplies reducing agent to an upstream side of the catalyst, thereby controlling the exhaust gases flowing into the NOx catalyst to the reducing atmosphere, whereby NOx trapped in the NOx catalyst is reduced to be purified. Further, the degree of degradation of the catalyst is estimated by degradation degree-estimating means, and the time period over which the reduction control should be executed by the NOx reduction control means is corrected according to the estimated degree of degradation of the catalyst.

As described above, when the catalyst is disposed upstream of the NOx catalyst, and the reducing agent is supplied to the upstream side of the catalyst, the supplied reducing agent is consumed by the catalyst before reaching the NOx catalyst, and the consumption amount of reducing agent varies with the degree of degradation of the catalyst. According to the present invention, the time period over which the reduction control should be executed, i.e. the time period over which reducing agent should be supplied is corrected according to the estimated degree of degradation of the catalyst. This makes it possible to supply a just enough amount of reducing agent to the NOx catalyst while causing the actual consumption amount of reducing agent dependent on the degree of degradation of the catalyst to be reflected thereon. As a result, it is possible to supply a just enough amount of reducing agent to the NOx catalyst, thereby making it possible to reduce exhaust emissions and improve fuel economy without causing insufficient reduction of NOx or excessive generation of HC and CO.

Preferably, the NOx reduction control means comprises reducing agent supply amount-calculating means for calculating a reducing agent supply amount indicative of an amount of reducing agent supplied to the NOx catalyst, and reduction control-terminating means for terminating the reduction control when the calculated reducing agent supply amount exceeds a threshold value, and the correction means performs the correction such that as the estimated degree of degradation of the catalyst is higher, the threshold value becomes smaller.

With the configuration of this exhaust emission control device, the reducing agent supply amount indicative of the amount of reducing agent supplied to the NOx catalyst is calculated, and when the calculated reducing agent supply amount exceeds a threshold value, the reduction control is terminated. Further, as the estimated degree of degradation of the catalyst is higher, the threshold value is corrected to be smaller. Accordingly, as the degree of degradation of the catalyst is higher, i.e. as the amount of reducing agent consumed in the catalyst is smaller, it becomes easier for the reducing agent supply amount to exceed the threshold value, which makes shorter the time period over which the reduction control should be executed. This makes it possible to supply a just enough amount of reducing agent to the NOx catalyst, and thereby obtain the aforementioned advantageous effects.

Preferably, the NOx reduction control means includes reducing agent supply amount-calculating means for calculating a reducing agent supply amount indicative of an amount of reducing agent supplied to the NOx catalyst, and reduction control-terminating means for terminating the reduction control when the calculated reducing agent supply amount exceeds a threshold value, and the correction means performs the correction such that as the estimated degree of degradation of the catalyst is higher, the calculated reducing agent supply amount becomes larger.

With the configuration of this exhaust emission control device, as the estimated degree of degradation of the catalyst is higher, the reducing agent supply amount for comparison with the threshold value is corrected to become larger. Therefore, similarly to the above-described preferred embodiment, as the amount of reducing agent consumed in the catalyst is smaller, it becomes easier for the reducing agent supply amount to exceed the threshold value, which makes shorter the time period over which the reduction control should be executed. This makes it possible to supply a just enough amount of reducing agent to the NOx catalyst, and thereby obtain the aforementioned advantageous effects.

Preferably, the degradation degree-estimating means includes upstream temperature-detecting means for detecting a temperature at a location upstream of the catalyst, and downstream temperature-detecting means for detecting a temperature at a location downstream of the catalyst, and estimates the degree of degradation of the catalyst, according to a degree of rise in the temperature at the location downstream of the catalyst with respect to the temperature at the location upstream of the catalyst, the temperatures being detected during execution of the reduction control.

As the degree of degradation of the three-way catalyst is higher, the oxygen storage capability and oxidation capability of the catalyst are lowered, so that the amount of heat generated by oxidation reaction of the reducing agent becomes smaller, which makes smaller the degree of rise in the temperature at a location downstream of the catalyst. Therefore, with this configuration, using the degree of rise in the temperature at the location downstream of the catalyst with respect to the temperature at a location upstream of the same which are detected during execution of the reduction control as a parameter, it is possible appropriately estimate the degree of degradation of the catalyst.

Preferably, the degradation degree-estimating means includes air-fuel ratio-estimating means for estimating an air-fuel ratio at a location downstream of the catalyst, and air-fuel ratio-detecting means for detecting an air-fuel ratio at the location downstream of the catalyst, and estimates the degree of degradation of the catalyst according to a degree of delay of the detected air-fuel ratio with respect to the air-fuel ratio estimated during execution of the reduction control.

As the degree of degradation of the catalyst is higher, the oxygen storage capability and the oxidization capability of the catalyst are lowered to terminate the oxidation reaction of the catalyst earlier, and hence the air-fuel ratio at the location downstream of the catalyst is changed to a richer side earlier. Therefore, with the configuration of this preferred embodiment, using the degree of delay of the detected air-fuel ratio with respect to the air-fuel ratio detected during execution of the reduction control, it is possible to appropriately estimate the degree of degradation of the catalyst.

To attain the object, in a second aspect of the present invention, there is provided a method of purifying exhaust gases discharged from an internal combustion engine into an exhaust system thereof, the engine including the exhaust system, a catalyst that is disposed in the exhaust system and has an oxidation function for purifying exhaust gases, and a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, the method comprising a NOx reduction control step of executing reduction control in which the exhaust gases flowing into the NOx catalyst is controlled to the reducing atmosphere, by supplying reducing agent to an upstream side of the catalyst so as to cause the NOx catalyst to carry out an operation for reducing NOx, a degradation degree-estimating step of estimating a degree of degradation of the catalyst, and a correction step of correcting a time period over which the reduction control should be executed in the NOx reduction control step, according to the estimated degree of degradation of the catalyst.

With the configuration of the second aspect of the present invention, it is possible to obtain the same advantageous effects as provided by the first aspect of the present invention.

Preferably, the NOx reduction control step includes a reducing agent supply amount-calculating step of calculating a reducing agent supply amount indicative of an amount of reducing agent supplied to the NOx catalyst, and a reduction control-terminating step of terminating the reduction control when the calculated reducing agent supply amount exceeds a threshold value, and the correction step includes performing the correction such that as the estimated degree of degradation of the catalyst is higher, the threshold value becomes smaller.

Preferably, the NOx reduction control step includes a reducing agent supply amount-calculating step of calculating a reducing agent supply amount indicative of an amount of reducing agent supplied to the NOx catalyst, and a reduction control-terminating step of terminating the reduction control when the calculated reducing agent supply amount exceeds a threshold value, and the correction step includes performing the correction such that as the estimated degree of degradation of the catalyst is higher, the calculated reducing agent supply amount becomes larger.

Preferably, the degradation degree-estimating step includes a upstream temperature-detecting step of detecting a temperature at a location upstream of the catalyst, and a downstream temperature-detecting step of detecting a temperature at a location downstream of the catalyst, and includes estimating the degree of degradation of the catalyst, according to a degree of rise in the temperature at the location downstream of the catalyst with respect to the temperature at the location upstream of the catalyst, the temperatures being detected during execution of the reduction control.

Preferably, the degradation degree-estimating step includes an air-fuel ratio-estimating step of estimating an air-fuel ratio at a location downstream of the catalyst, and an air-fuel ratio-detecting step of detecting an air-fuel ratio at the location downstream of the catalyst, and includes estimating the degree of degradation of the catalyst according to the degree of delay of the detected air-fuel ratio with respect to the air-fuel ratio estimated during execution of the reduction control.

With the configurations of these preferred embodiments, it is possible to obtain the same advantageous effects as provided by the respective corresponding preferred embodiments of the first aspect of the present invention.

To attain the object, in a third aspect of the present invention, there is provided an engine control unit including a control program for causing a computer to execute a method of purifying exhaust gases discharged from an internal combustion engine into an exhaust system thereof, the engine including the exhaust system, a catalyst that is disposed in the exhaust system and has an oxidation function for purifying exhaust gases, and a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, wherein the control program causes the computer to execute reduction control in which the exhaust gases flowing into the NOx catalyst is controlled to the reducing atmosphere, by supplying reducing agent to an upstream side of the catalyst so as to cause the NOx catalyst to carry out an operation for reducing NOx, estimate a degree of degradation of the catalyst, and correct a time period over which the reduction control should be executed, according to the estimated degree of degradation of the catalyst.

With the configuration of the third aspect of the present invention, it is possible to obtain the same advantageous effects as provided by the first aspect of the present invention.

Preferably, the control program causes the computer to calculate a reducing agent supply amount indicative of an amount of reducing agent supplied to the NOx catalyst, terminate the reduction control when the calculated reducing agent supply amount exceeds a threshold value, and perform the correction such that as the estimated degree of degradation of the catalyst is higher, the threshold value becomes smaller.

Preferably, the control program causes the computer to calculate a reducing agent supply amount indicative of an amount of reducing agent supplied to the NOx catalyst, terminate the reduction control when the calculated reducing agent supply amount exceeds a threshold value, and perform the correction such that as the estimated degree of degradation of the catalyst is higher, the calculated reducing agent supply amount becomes larger.

Preferably, the control program causes the computer to detect a temperature at a location upstream of the catalyst, detect a temperature at a location downstream of the catalyst, and estimate the degree of degradation of the catalyst, according to a degree of rise in the temperature at the location downstream of the catalyst with respect to the temperature at the location upstream of the catalyst, the temperatures being detected during execution of the reduction control.

Preferably, the control program causes the computer to estimate an air-fuel ratio at a location downstream of the catalyst, detect an air-fuel ratio at the location downstream of the catalyst, and estimate the degree of degradation of the catalyst according to the degree of delay of the detected air-fuel ratio with respect to the air-fuel ratio estimated during execution of the reduction control.

The above and other objects, features, and advantages of the present invention will become more apparent from the following detailed description taken in conjunction with the accompanying drawings.

DETAILED DESCRIPTION OF PREFERRED EMBODIMENTS

Figure 1:
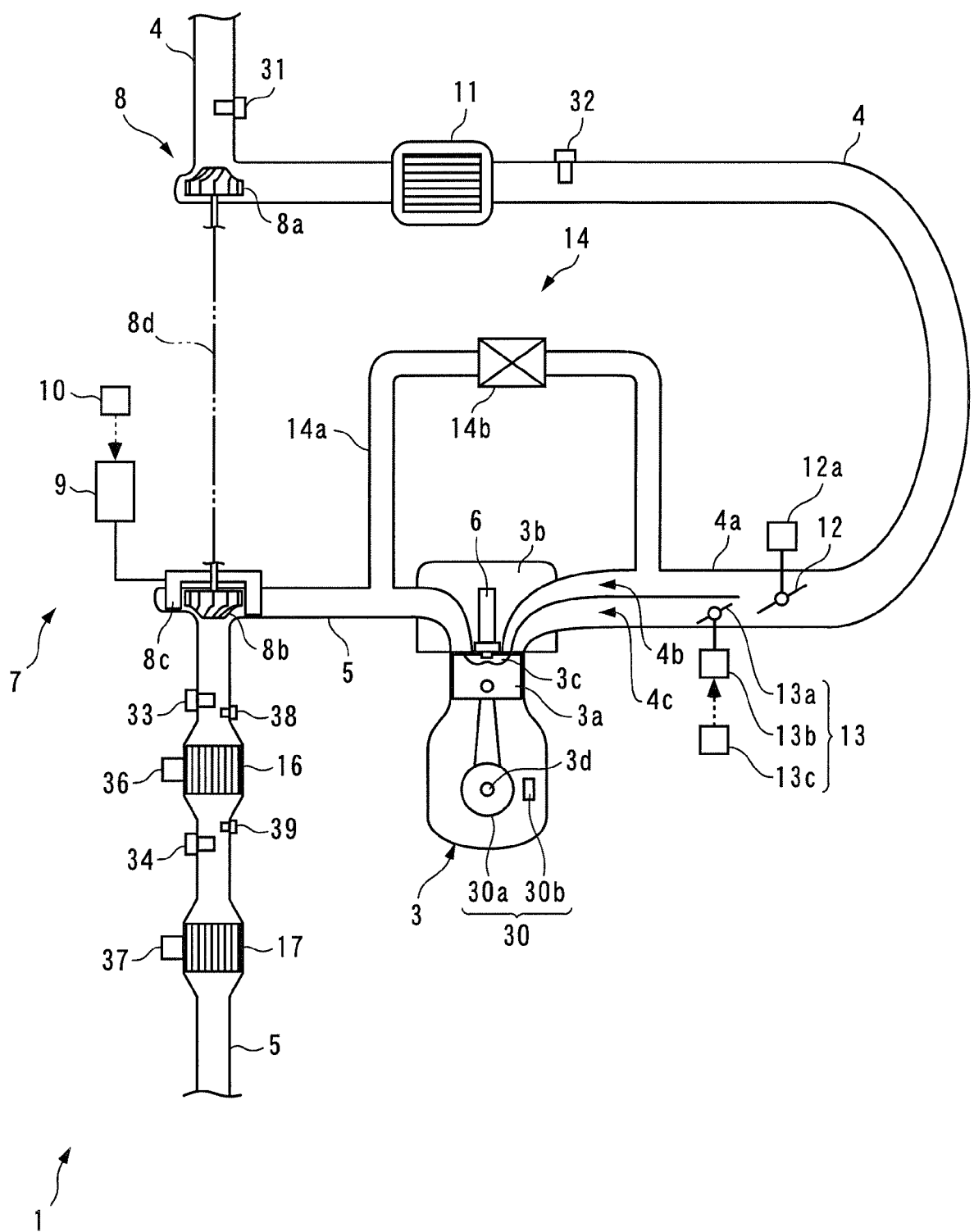
FIG. 1 is a schematic diagram of an internal combustion engine to which is applied an exhaust emission control device according to a first embodiment of the present invention.

Hereafter, an exhaust emission control device according to an embodiment of the present invention will be described with reference to the drawings. FIG. 1 is a diagram showing the exhaust emission control device 1 to which is applied the present invention, and an internal combustion engine 3. The engine (hereinafter simply referred to as "the engine") 3 is a diesel engine that has e.g. four cylinders (only one of which is shown), and is installed on a vehicle.

A combustion chamber 3c is defined between a piston 3a and a cylinder head 3b for each cylinder of the engine 3. The cylinder head 3b has an intake pipe 4 and an exhaust pipe 5 connected thereto, with a fuel injection valve (hereinafter referred to as "the injector") 6 (NOx reduction control means) mounted therethrough such that it faces the combustion chamber 3c.

Figure 2:
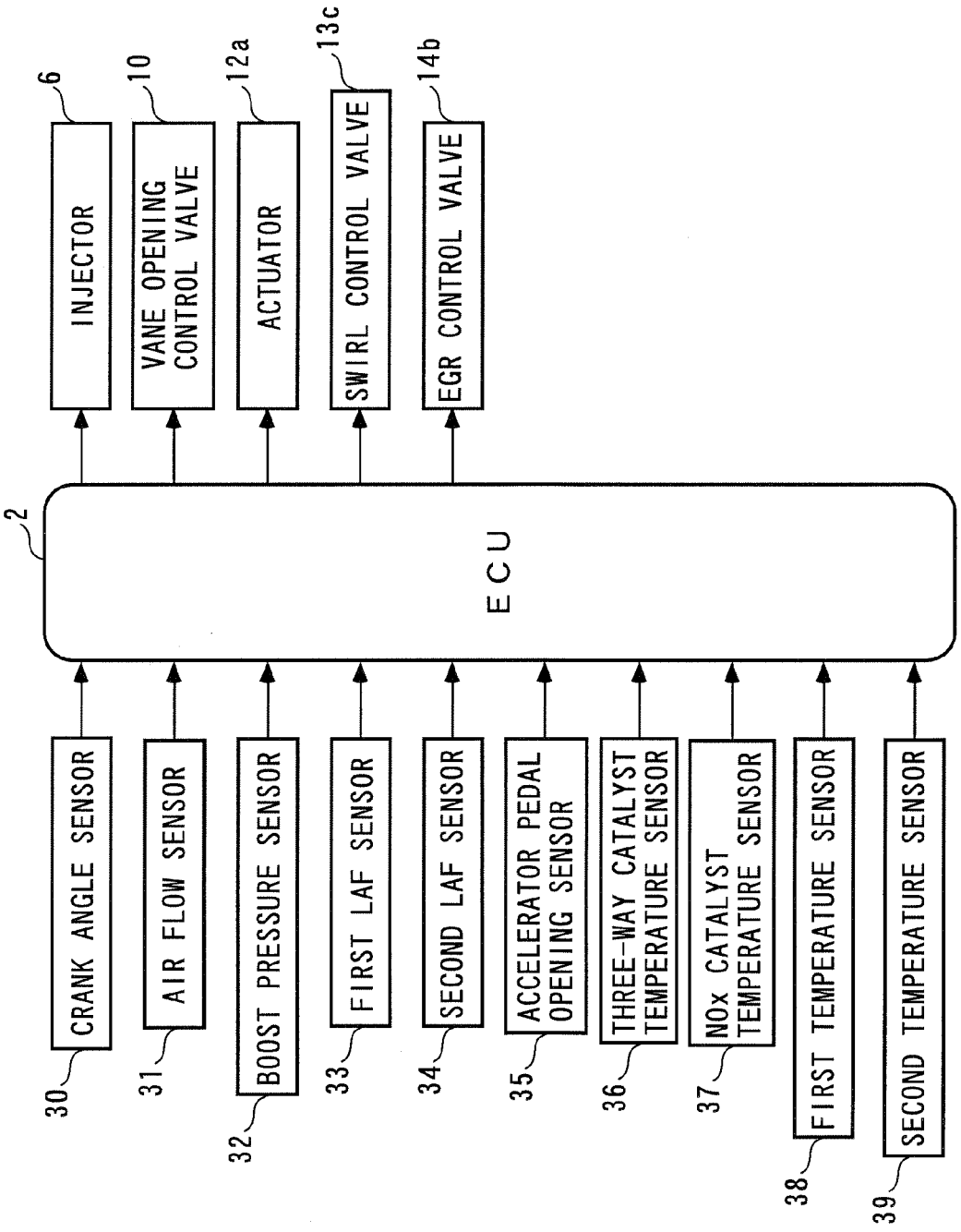
FIG. 2 is a block diagram showing a relationship between an ECU and signals input thereto and output therefrom.

The injector 6 is inserted into the combustion chamber 3c through a central portion of the top wall thereof, and is connected to a high-pressure pump and a fuel tank, neither of which is shown, in the mentioned order via a common rail. A fuel injection amount TOUT of fuel injected from the injector 6 is controlled by controlling the valve-opening time period thereof by a drive signal from the ECU 2 (see FIG. 2).

A magnet rotor 30a is mounted on a crankshaft 3d of the engine 3. The magnet rotor 30a and an MRE pickup 30b form a crank angle sensor 30 which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the intake stroke thereof, and in the case of the four-cylinder engine of the illustrated example, it is delivered whenever the crankshaft 3d rotates through 180 degrees.

The intake pipe 4 has a supercharging device 7 disposed therein. The supercharging device 7 is comprised of a supercharger 8 formed by a turbo charger, an actuator 9 connected to the supercharger 8, and a vane opening control valve 10.

The supercharger 8 includes a compressor blade 8a rotatably mounted in the intake pipe 4, a rotatable turbine blade 8b and a plurality of rotatable variable vanes 8c (only two of which are shown) provided in the exhaust pipe 5, and a shaft 8d integrally formed with the two blades 8a and 8b such that the shaft 8d connects them. In the supercharger 8, as the turbine blade 8b is driven for rotation by exhaust gases flowing through the exhaust pipe 5, the compressor blade 8a integrally formed with the shaft 8d which connects between the compressor blade 8a and the turbine blade 8b is also rotated is also rotated, whereby the supercharger 8 is caused to perform a supercharging operation for pressurizing intake air in the intake pipe 4.

The actuator 9 is of a diaphragm type which is operated by negative pressure, and is mechanically connected to the respective variable vanes 8c. The actuator 9 has negative pressure supplied from a negative pressure pump (not shown) through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of the variable vanes 8c. Thus, boost pressure is controlled.

An intercooler 11 of a water cooling type, and a throttle valve 12 (NOx reduction control means) are inserted into the intake pipe 4 at respective locations downstream of the supercharger 8 from upstream to downstream in the mentioned order. The intercooler 11 is provided for cooling intake air e.g. when the temperature of the intake air is raised by the supercharging operation of the supercharging device 7. An actuator 12a comprised e.g. of a DC motor is connected to the throttle valve 12. The opening TH of the throttle valve 12 (hereinafter referred to as "the throttle valve opening TH") is controlled by controlling the duty factor of electric current supplied to the actuator 12a by the ECU 2.

Further, the intake pipe 4 has an air flow sensor 31 inserted therein at a location upstream of the supercharger 8, and a boost pressure sensor 32 inserted therein between the intercooler 11 and the throttle valve 12. The air flow sensor 31 detects an intake air amount QA, to deliver a signal indicative of the sensed intake air amount QA to the ECU 2, while the boost pressure sensor 32 detects boost pressure PACT in the intake pipe 4, to deliver a signal indicative of the sensed boost pressure PACT to the ECU 2.

Furthermore, the intake pipe 4 has an intake manifold 4a divided into a swirl passage 4b and a bypass passage 4c between the collecting section of the intake manifold 4a and each branch portion thereof. The passages 4b and 4c communicate with the combustion chamber 3c via each intake port.

The bypass passage 4c is provided with a swirl device 13 for generating a swirl in the combustion chamber 3c. The swirl device 13 is comprised of a swirl valve 13a, an actuator 13b for actuating the swirl valve 13a to open and close the same, and a swirl control valve 13c. The actuator 13b and the swirl control valve 13c are configured similarly to the actuator 9 and the vane opening control valve 10 of the supercharging device 7, respectively. The swirl control valve 13c is connected to the above-described negative pressure pump. With this arrangement, the degree of opening of the swirl control valve 13c is controlled by a drive signal from the ECU 2, whereby negative pressure supplied to the actuator 13b is changed to change the degree of opening of the swirl valve 13a, whereby the strength of the swirl is controlled.

Further, the engine 3 is provided with an EGR device 14 that has an EGR pipe 14a and an EGR control valve 14b. The EGR pipe 14a connects between the intake pipe 4 and the exhaust pipe 5, more specifically, between the swirl passage 4b in the collecting section of the intake manifold 4a and a portion of the exhaust pipe 5 at a location upstream of the supercharger 8. Part of exhaust gases exhausted from the engine 3 is recirculated into the intake pipe 4 via the EGR pipe 14a as EGR gases.

The EGR control valve 14b is implemented by a linear solenoid valve inserted into the EGR pipe 14a, and the valve lift amount VLACT thereof is linearly controlled by a drive signal under duty ratio control from the ECU 2, whereby the amount of EGR gases is controlled.

A three-way catalyst 16 (catalyst) and a NOx catalyst 17 are provided in the exhaust pipe 5 at respective locations downstream of the supercharger 8 from upstream to downstream in the mentioned order. The three-way catalyst 16 oxidizes HC and CO and performs reduction of NOx in a stoichiometric atmosphere of exhaust gases, to thereby purify i.e. decrease exhaust emissions. The NOx catalyst 17 traps NOx contained in an oxidizing atmosphere of exhaust gases in which the concentration of oxygen is high, and performs reduction of the trapped NOx in a reducing atmosphere in which a large amount of reducing agent is contained in exhaust gases, to thereby purify exhaust emissions.

Further, the three-way catalyst 16 is provided with a three-way catalyst temperature sensor 36 for detecting the temperature TTWC of the three-way catalyst 16 (hereinafter referred to as "the three-way catalyst temperature TTWC"), while the NOx catalyst 17 is provided with a NOx catalyst temperature sensor 37 for detecting the temperature TLNC of the NOx catalyst 17 (hereinafter referred to as "the NOx catalyst temperature TLNC"). These sensors 36 and 37 deliver respective signals indicative of the detected NOx catalyst temperature TLNC and three-way catalyst temperature TTWC to the ECU 2. Further, first and second temperature sensors 38 and 39 (upstream temperature-detecting means and downstream temperature-detecting means) are disposed at locations immediately upstream and downstream of the three-way catalyst 16. These temperature sensors 38 and 39 detect upstream temperature TTWC1 and downstream temperature TTWC2 at locations upstream and downstream of the three-way catalyst 16, respectively, to deliver respective signals indicative of the detected upstream temperature TTWC1 and downstream temperature TTWC2 to the ECU 2.

Furthermore, a first LAF sensor 33 and a second LAF sensor 34 (air-fuel ratio-detecting means) are inserted into the exhaust pipe 5 at respective locations upstream of and downstream of the three-way catalyst 16. The first LAF sensor 33 and the second LAF sensor 34 linearly detect the concentrations VLAF1 and VLAF2 of oxygen in exhaust gases, respectively, in a wide range of the air-fuel ratio ranging from a rich region to a lean region to deliver respective signals indicative of the sensed concentrations of oxygen to the ECU 2. The ECU 2 calculates first and second actual air-fuel ratios AF1_ACT and AF2_ACT indicative of respective air-fuel ratios corresponding to the detected oxygen concentrations VLAF1 and VLAF2, respectively. Further, an accelerator pedal opening sensor 35 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

In the present embodiment, the ECU 2 forms NOx reduction control means, degradation degree-estimating means, correction means, reducing agent supply amount-calculating means, reduction control-terminating means, and air-fuel ratio-estimating means, and is implemented by a microcomputer comprised of an I/O interface, a CPU, a RAM, and a ROM. The detection signals from the aforementioned sensors 30 to 39 are input to the CPU after the I/O interface performs A/D conversion and waveform shaping thereon.

In response to these input signals, the CPU determines operating conditions of the engine 3, and based on the determined operating conditions of the engine, performs engine control, such as fuel injection amount control and intake air amount control, in accordance with control programs read from the ROM. Further, the CPU determines whether or not rich spike should be executed as reduction control for performing reduction of NOx trapped in the NOx catalyst 17, and performs the rich spike according to the result of the determination. It should be noted as described hereinafter, the rich spike is performed by increasing the fuel injection amount TOUT and decreasing the intake air amount QA, thereby enriching the air-fuel ratio of a mixture supplied to the combustion chamber 3c, to supply unburned components of fuel to the NOx catalyst 17 as reducing agent.

Figure 3:
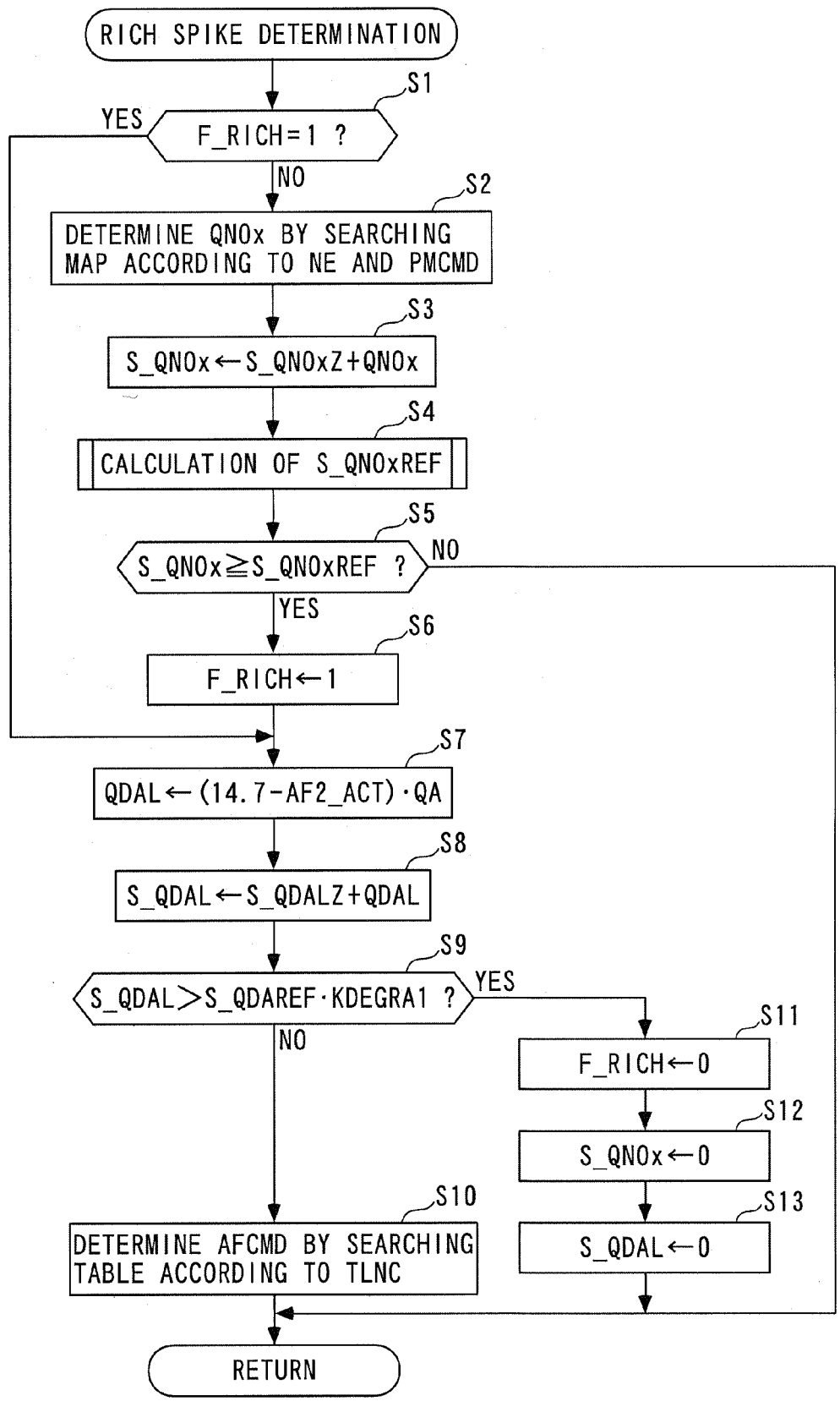
FIG. 3 is a flowchart showing a process for determining execution of rich spike.

FIG. 3 shows a process for determining the execution of the rich spike. The process is executed whenever a predetermined time period elapses. First, in a step 1 (shown as S1 in abbreviated form in FIG. 3; the following steps are also shown in abbreviated form), it is determined whether or not a rich spike flag F_RICH is equal to 1. As described hereinafter, the rich spike flag F_RICH is set to 1 if conditions for executing the rich spike are satisfied.

If the answer to the question of the step 1 is negative (NO), i.e. if the rich spike is not being executed, the process proceeds to a step 2, wherein a trapped NOx amount QNOx is calculated by searing a map (not shown) according to the engine speed NE and demanded torque PMCMD. The trapped NOx amount QNOx corresponds to the amount of NOx in exhaust gases discharged from the combustion chamber 3c in the present cycle, and represents the amount of NOx trapped in the NOx catalyst 17 during the same. It should be noted that the demanded torque PMCMD is determined by searching a map (not shown) according to the engine speed NE and the accelerator pedal opening AP.

Next, a cumulative value S_QNOx of the trapped NOx amount is calculated by adding the calculated trapped NOx amount to the immediately preceding value S_QNOxZ of the cumulative value of the trapped NOx amount. That is, the cumulative value S_QNOx of the trapped NOx amount corresponds to the amount of NOx having been trapped in the NOx catalyst 17.

Then, in a step 4, a trapped NOx amount reference value S_QNOxREF is calculated. Detailed description thereof will be given hereinafter.

Next, in a step 5, it is determined whether or not the cumulative value S_QNOx of the trapped NOx amount is not smaller than the trapped NOx amount reference value S_QNOxREF. If the answer to this question is negative (NO), it is judged that since the amount of NOx trapped in the NOx catalyst 17 is still small, the rich spike should not be executed, and the present process is immediately terminated. On the other hand, if the answer to the question of the step 5 is affirmative (YES), i.e. if S_QNOx≧S_QNOxREF holds, it is judged that the rich spike should be executed, so that the rich spike flag F_RICH is set to 1 (step 6) to start the rich spike.

Then, in a step 7, a reducing agent supply amount QDAL is calculated. The reducing agent supply amount QDAL represents the amount of reducing agent supplied to the NOx catalyst 17, and is determined by multiplying a value obtained by subtracting the second actual air-fuel ratio AF2_ACT from 14.7 representative of a stoichiometric air-fuel ratio, by the intake air amount QA corresponding to the flow rate of exhaust gases. It should be noted that the space velocity SV of exhaust gases may be used in place of the intake air amount QA.

Next, a cumulative value S_QDAL of the reducing agent supply amount is calculated by adding the calculated reducing agent supply amount QDAL to the immediately preceding value S_QDALZ of the cumulative value of the reducing agent supply amount (step 8).

Next, it is determined whether or not the cumulative value S_QDAL of the reducing agent supply amount is larger than a value obtained by multiplying a reducing agent amount reference value S_QDAREF by a first degradation-dependent correction coefficient KDEGRA1 (step 9). The reducing agent amount reference value S_QDAREF is set according to the trapped NOx amount reference value S_QNOxREF calculated in the step 4. Further, the first degradation-dependent correction coefficient KDEGRA1 is calculated according to an estimated degree DEGRA of degradation (degradation degree) of the three-way catalyst 16, in a process, described hereinafter, for estimating a degree of degradation of the three-way catalyst 16.

If the answer to the question of the step 9 is negative (NO), i.e. if S_QDAL≦S_QDAREF·KDEGRA1 holds, it is judged that a sufficient amount of reducing agent has not been supplied to the NOx catalyst 17 yet, and hence the reduction of NOx has not been completed, so that the rich spike is continued. Next, in a step 10, a target air-fuel ratio AFCMD is calculated by searching a table shown in FIG. 6 according to the NOx catalyst temperature TLNC, followed by terminating the present process.

Figure 6:
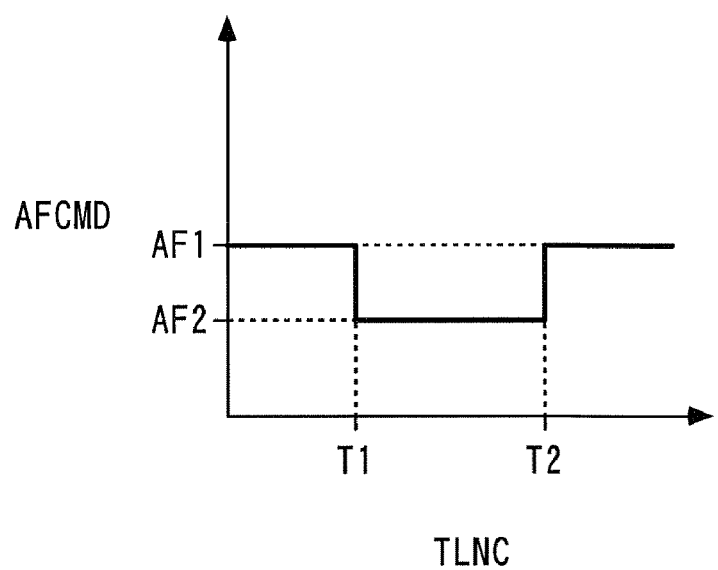
FIG. 6 is a diagram showing an example of an AFCMD table for use in the FIG. 3 process.

As shown in FIG. 6, in the table, when the NOx catalyst temperature TLNC is not higher than a first predetermined temperature T1 (e.g. 200° C.), and when the NOx catalyst temperature TLNC is not lower than a second predetermined temperature T2 (e.g. 400° C.) higher than the first predetermined temperature T1, the target air-fuel ratio AFCMD is set to a first air-fuel ratio AF1 (e.g. 14.3) which is slightly rich, i.e. slightly lower than 14.7 corresponding to the stoichiometric air-fuel ratio. This is to perform reduction control mainly by the three-way catalyst 16 since it is estimated that the NOx catalyst 17 is not active enough when the temperature TLNC is within the above-described ranges. On the other hand, when the NOx catalyst temperature TLNC is between the first predetermined temperature T1 and the second predetermined temperature T2, it is estimated that the NOx catalyst 17 is active enough, and hence to perform reduction control by the NOx catalyst 17, the target air-fuel ratio AFCMD is set to a second air-fuel ratio AF2 (e.g. 14.0) richer than the first air-fuel ratio AF1.

On the other hand, if the answer to this question is affirmative (YES), i.e. if S_QDAL>S_QDAREF·KDEGRA1 holds, it is judged that a sufficient amount of reducing agent has been supplied to the NOx catalyst 17, and hence the reduction of NOx is completed, so that the rich spike flag F_RICH is set to 0 (step 11), to terminate the rich spike. Further, the cumulative value S_QNOX of the trapped NOx amount and the cumulative value S_QDAL of the reducing agent supply amount are reset to 0 (steps 12 and 13), followed by terminating the present process.

Figure 4:
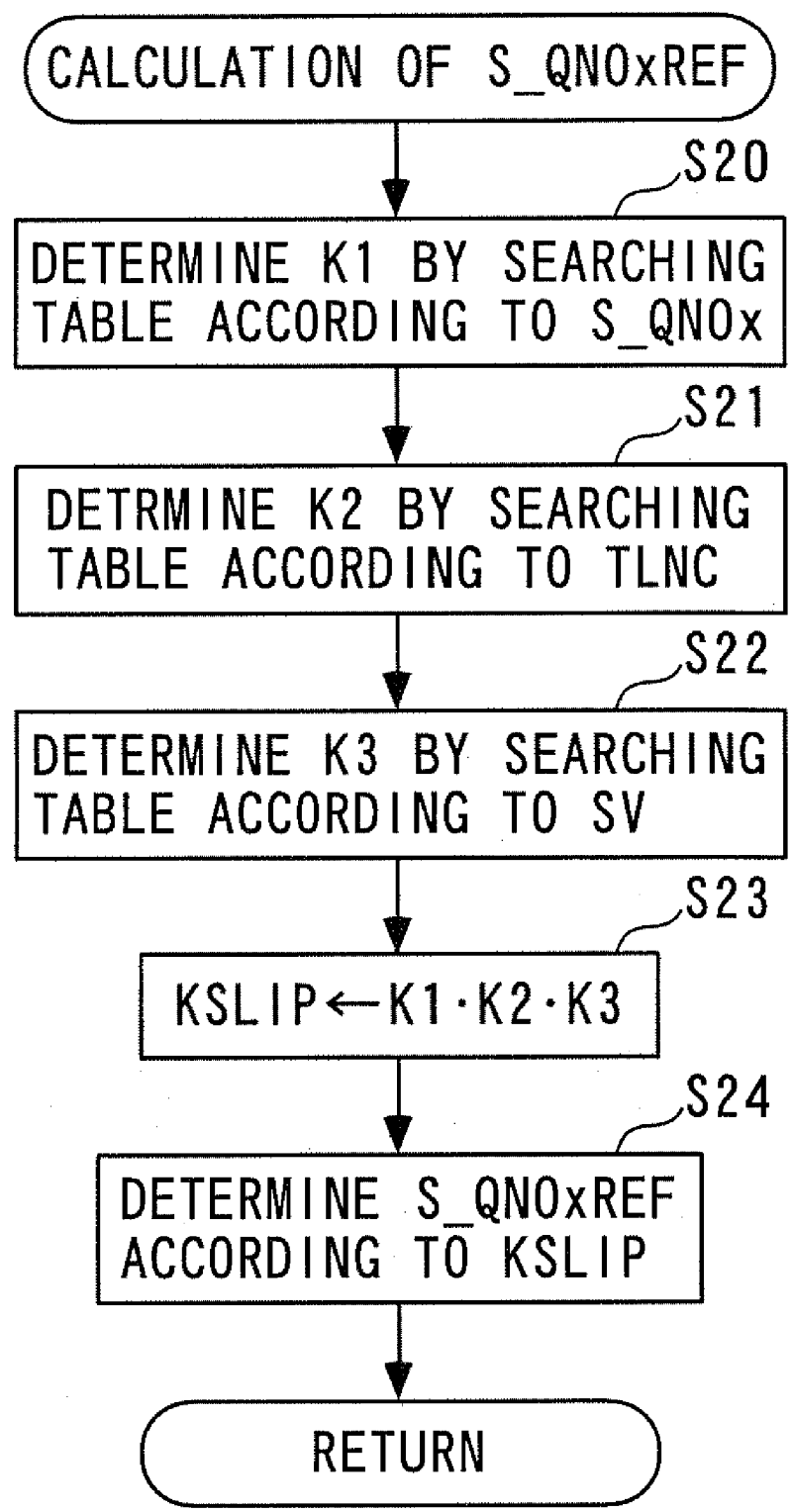
FIG. 4 is a flowchart showing a process for calculating a trapped NOx amount reference value.

FIG. 4 shows a process for calculating the trapped NOx amount reference value S_QNOxREF, executed in the step 4 in FIG. 3. In this process, the trapped NOx amount reference value S_QNOxREF is calculated by taking into account parameters influencing a state of occurrence of NOx slip (phenomenon in which during reduction control of NOx, part of NOx trapped by a NOx catalyst desorbs from the NOx catalyst without being reduced) and characteristics of the NOx slip.

First, in a step 20, a first coefficient K1 is determined by searching a table (not shown) according to the cumulative value S_QNOx of the trapped NOx amount. The first coefficient K1 is set to a larger value as the cumulative value S_QNOX is larger, based on a characteristic of the amount of NOx slip dependent on the cumulative value S_QNOX.

Then, in a step 21, a second coefficient K2 is determined by searching a K2 table (not shown) according to the NOx catalyst temperature TLNC. In this K2 table, the second coefficient K2 is set to a smaller value as the NOx catalyst temperature TLNC is higher, based on a characteristic of the amount of NOx slip dependent on the NOx catalyst temperature TLNC.

Next, in a step 22, a third coefficient K3 is determined by searching a K3 table (not shown) according to the space velocity SV of exhaust gases. In this K3 table, the third coefficient K3 is set to a larger value as the space velocity SV is higher, based on a characteristic of the amount of NOx slip dependent on the space velocity SV.

Figure 5:
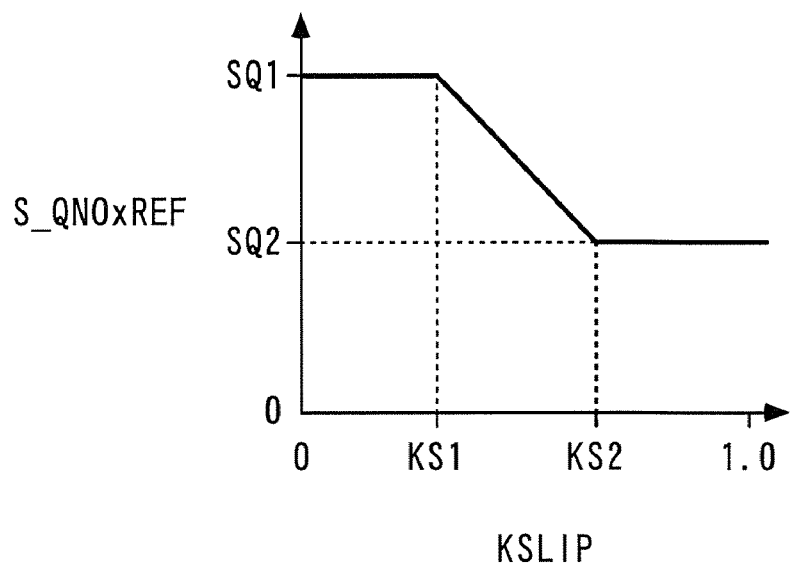
FIG. 5 is a diagram showing an example of an S_QNOxREF table for use in the FIG. 4 process.

Then, in a step 23, a slip coefficient KSLIP is calculated by multiplying the first to third coefficients K1 to K3 calculated in the steps 20 to 22, by each other. In a step 24 following the step 23, the trapped NOx amount reference value S_QNOxREF is determined by searching a table shown in FIG. 5 according to the slip coefficient KSLIP, followed by terminating the present process.

In this table, the trapped NOx amount reference value S_QNOxREF is set to a first reference value SQ1 when the slip coefficient KSLIP is not larger than a first predetermined value KS1, whereas it is set to a second reference value SQ2 smaller than the first reference value SQ1 when the slip coefficient KSLIP is not smaller than a second predetermined value KS2. Further, when the slip coefficient KSLIP is between the first and second predetermined values KS1 and KS2, the trapped NOx amount reference value S_QNOxREF is set such that it linearly changes between the first and second reference values SQ1 and SQ2.

As described above, the trapped NOx amount reference value S_QNOxREF is basically set to a smaller value as the slip coefficient KSLIP is larger, i.e. as the estimated amount of NOx slip is larger. Then, the trapped NOx amount reference value S_QNOxREF set as above is compared with the cumulative value S_QNOX of the trapped NOx amount in the step 5 appearing in FIG. 3. As a consequence, the timing for execution of the rich spike is advanced as the predicted amount of NOx slip is larger.

Figure 7:
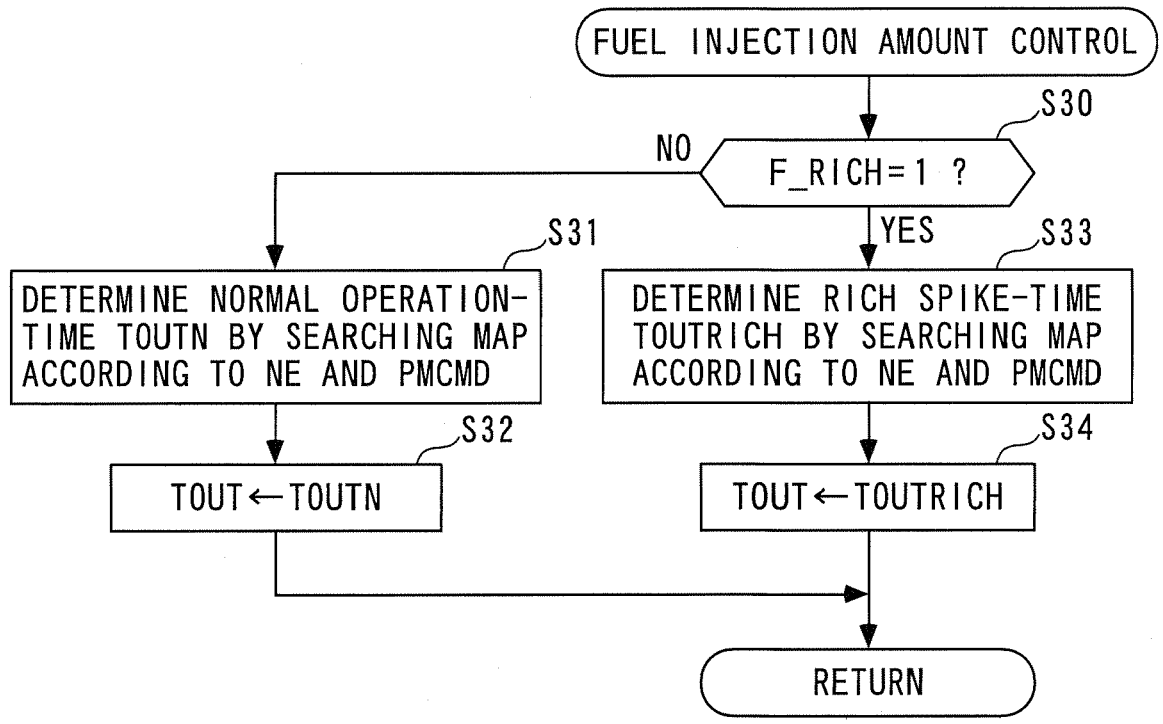
FIG. 7 is a flowchart showing a control process for controlling a fuel injection amount.

FIG. 7 shows a control process for controlling the fuel injection amount. In this process, the fuel injection amount of the injector 6 is controlled according to whether or not the conditions for executing the rich spike are satisfied, which is determined in the FIG. 3 process. First, in a step 30, it is determined whether or not the rich spike flag F_RICH is equal to 1.

If the answer to this question is negative (NO), i.e. if the conditions for executing the rich spike are not satisfied, a normal operation-time fuel injection amount TOUTN is calculated by searching a map (not shown) according to the engine speed NE and the demanded torque PMCMD (step 31), and the calculated normal operation-time fuel injection amount TOUTN is set as the fuel injection amount TOUT (step 32), followed by terminating the present process.

On the other hand, if the answer to the question of the step 30 is affirmative (YES), i.e. if the conditions for executing the rich spike are satisfied, a rich spike-time fuel injection amount TOUTRICH is calculated by searching a map (not shown) according to the engine speed NE and the demanded torque PMCMD (step 33). The rich spike-time fuel injection amount TOUTRICH is set to a larger value than the value of the normal operation-time fuel injection amount TOUTN.

Then, the rich spike-time fuel injection amount TOUTRICH calculated in the step 33 is set as the fuel injection amount TOUT (step 34), followed by terminating the present process.

Figure 8:
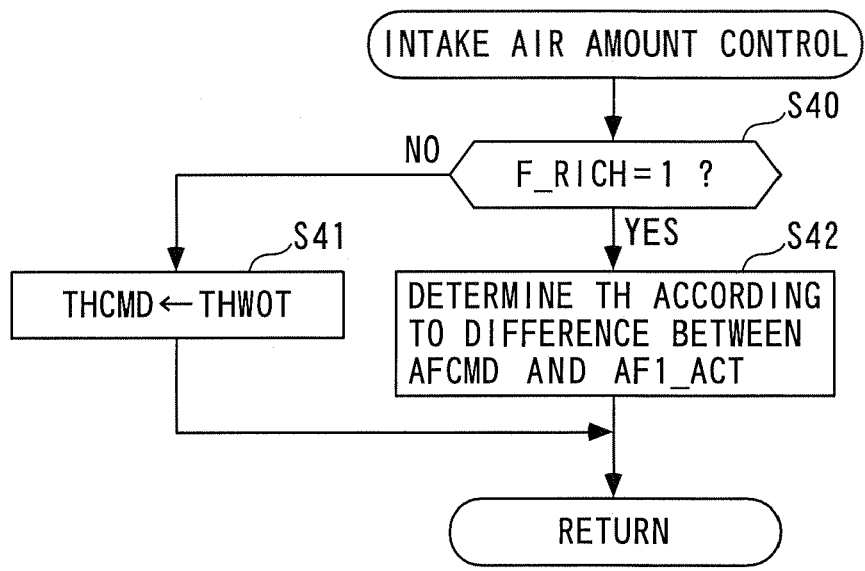
FIG. 8 is a flowchart showing a control process for controlling an intake air amount.

FIG. 8 shows a control process for controlling the intake air amount. In this process, the throttle valve opening TH is controlled according to whether or not the conditions for executing the rich spike are satisfied, whereby the intake air amount QA is controlled. First, in a step 40, it is determined whether or not the rich spike flag F_RICH is equal to 1.

If the answer to this question is negative (NO), i.e. if the conditions for executing the rich spike are not satisfied, a target throttle valve opening THCMD is set to a full opening THWOT (step 41), followed by terminating the present process.

On the other hand, if the answer to the question of the step 40 is affirmative (YES), i.e. if the conditions for executing the rich spike are satisfied, a rich spike-time throttle valve opening TH is determined based on the difference between the target air-fuel ratio AFCMD determined in the step 10 in FIG. 3 and the first actual air-fuel ratio AF1_ACT (step 42), followed by terminating the present process.

As described above, the rich spike is performed by making the fuel injection amount TOUT larger and the intake air amount QA smaller through control of the throttle valve 12, than during normal operation of the engine 3. It should be noted that the intake air amount QA may be controlled by controlling the supercharging device 7, the swirl device 13, or the EGR device 14 in place of or in combination of control of the throttle valve 12.

Figure 9:
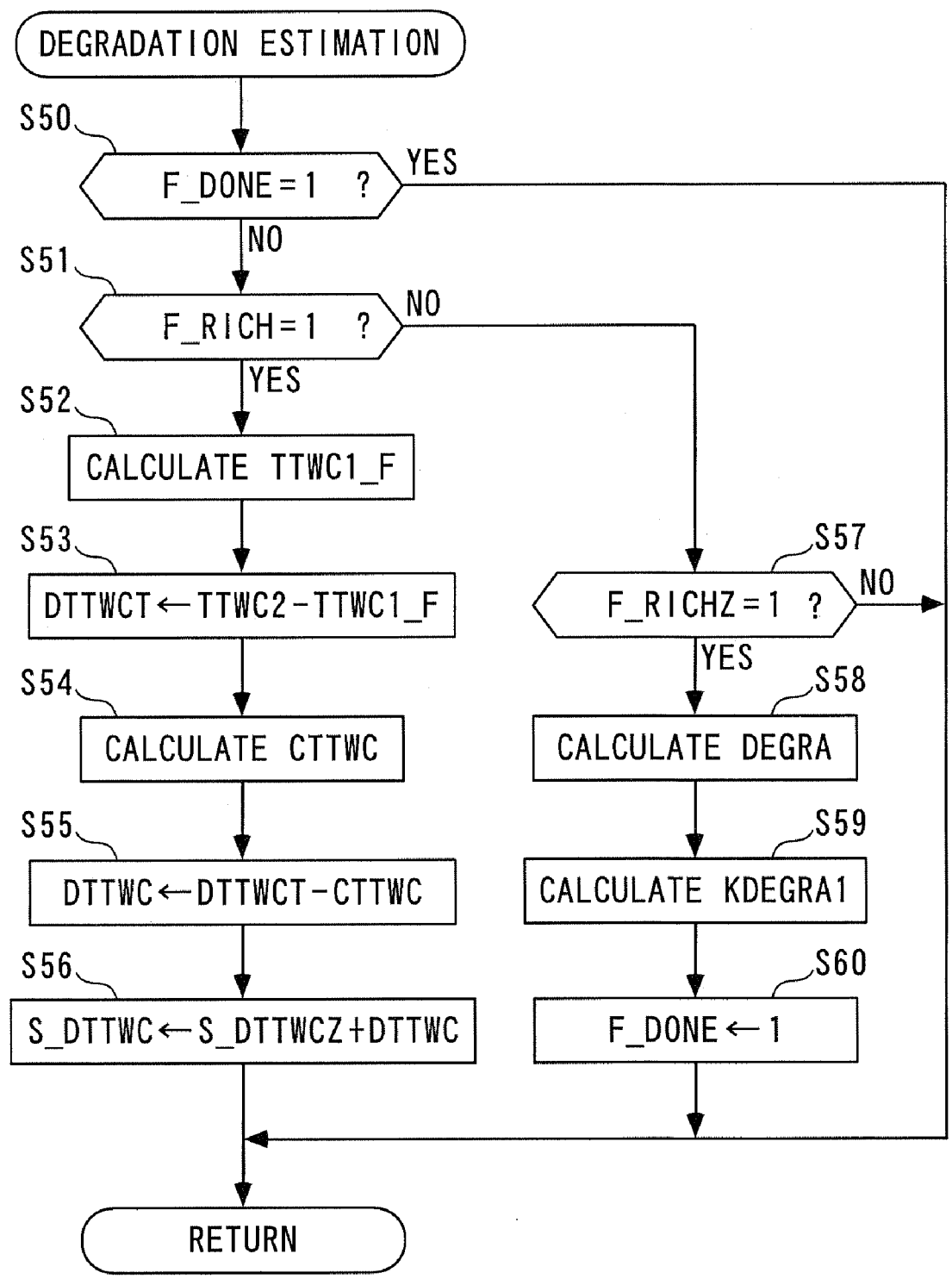
FIG. 9 is a flowchart showing a process for estimating degradation of a three-way catalyst, which is executed by the exhaust emission control device according to the first embodiment.

FIG. 9 shows the process for estimating degradation of the three-way catalyst 16, which is executed by the exhaust emission control device according to the first embodiment. According to this process, from the mutual relationship between the upstream temperature TTWC1 and the downstream temperature TTWC2 of the three-way catalyst 16 detected by the first and second temperature sensor 38 and 39, the degradation degree DEGRA of the three-way catalyst is estimated, and according to the estimated degradation degree DEGRA, the first degradation-dependent correction coefficient KDEGRA1 to be applied to the reducing agent amount reference value S_QDAREF in the step 9 in FIG. 3 is calculated.

In this process, first, it is determined whether or not an estimation completion flag F_DONE is equal to 1 (step 50). If the answer to this question is affirmative (YES), i.e. if the estimation of the degradation degree of the three-way catalyst 16 is completed, the present process is immediately terminated.

On the other hand, if the answer to the question of the step 50 is negative (NO), it is determined whether or not the rich spike flag F_RICH is equal to 1 (step 51). If the answer to this question is affirmative (YES), i.e. if the rich spike is being executed, a filtered upstream temperature value TTWC1_F is calculated by first-order lag filtering of the TTWC1 to correct the lag of the downstream temperature TTWC2 with respect to the upstream temperature TTWC1 (step 52). Further, a provisional temperature difference value DTTWCT is calculated by subtracting the filtered upstream temperature value TTWC1_F from the downstream temperature TTWC2 (step 53).

Figure 10:
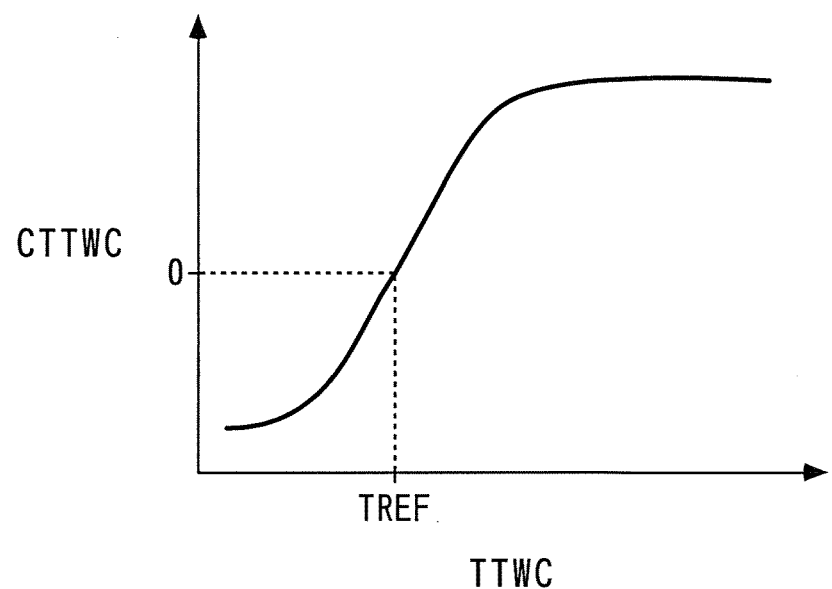
FIG. 10 is a diagram showing an example of a CTTWC table for use in the FIG. 9 process.

Next, a temperature correction value CTTWC is calculated by searching a table shown in FIG. 10 according to the three-way catalyst temperature TTWC detected by the three-way catalyst temperature 36 (step 54). In this table, the temperature correction value CTTWC is set to 0 when the three-way catalyst temperature TTWC is equal to a predetermined reference temperature TREF, and as the three-way catalyst temperature TTWC is higher, it is set to a larger value. This is because as the temperature of the three-way catalyst 16 is higher, the degree of activity thereof is higher, and hence the oxidation reaction of the reducing agent is actively carried out in the three-way catalyst 16, which increases a degree of rise in the downstream temperature.

Next, a temperature difference DTTWC is calculated by subtracting the temperature correction value CTTWC from the provisional temperature difference value DTTWCT (step 55). Then, the calculated temperature difference DTTWC is added to the immediately preceding value S_DTTWCZ of a cumulative temperature difference value to thereby calculate the cumulative temperature difference value S_DTTWC (step 56), followed by terminating the present process. As described above, during execution of the rich spike, the cumulative temperature difference value S_DTTWC is calculated according to the difference between the downstream temperature TTWC2 and the upstream temperature TTWC1.

Figure 11:
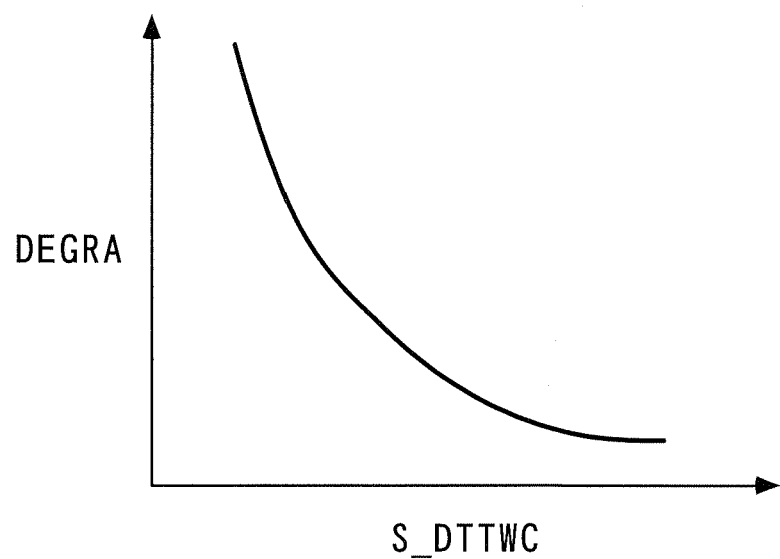
FIG. 11 is a diagram showing an example of a DEGRA table for use in the FIG. 9 process.

On the other hand, if the answer to the question of the step 51 is negative (NO), i.e. if the rich spike is not being executed, it is determined whether or not the immediately preceding value F_RICHZ of the rich spike flag is equal to 1 (step 57). If the answer to this question is negative (NO), the present process is immediately terminated, whereas if the answer to the question of this step 57 is affirmative (YES), i.e. if this is the first control timing after termination of the rich spike, the degradation degree DEGRA of the three-way catalyst 16 is calculated by searching a table shown in FIG. 11 according to the cumulative temperature difference value S_DTTWC calculated during the rich spike (step 58).

In this table, the degradation degree DEGRA is set to a larger value as the cumulative temperature difference value S_DTTWC is smaller, i.e. the degree of rise in the downstream temperature TTWC2 with respect to the upstream temperature TTWC1 is lower. This is because as the degradation of the three-way catalyst 16 proceeds, the oxygen storage capability and the oxidation capability of the same are lowered, to lower the degree of rise in the downstream temperature caused by the oxidation reaction of the reducing agent in the three-way catalyst 16.

Figure 12:
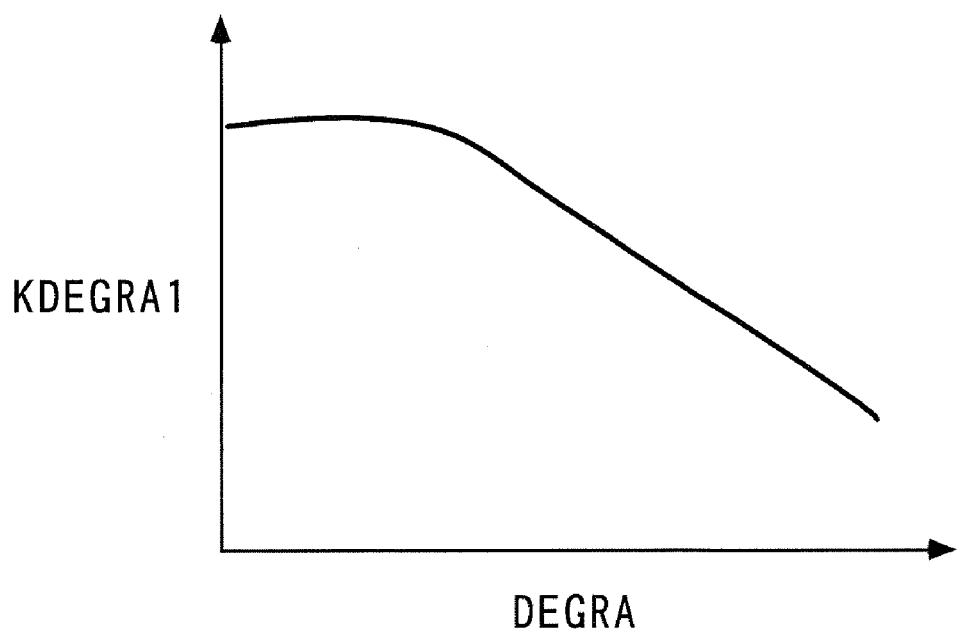
FIG. 12 is a diagram showing an example of a KDEGR1 table for use in the FIG. 9 process.

Next, a first degradation-depending correction coefficient KDEGRA1 is calculated by searching a table shown in FIG. 12 according to the calculated degradation degree DEGRA of the three-way catalyst 16 (step 59). In this table, the first degradation correction coefficient KDEGRA1 is set to a smaller value as the degradation degree DEGRA is higher.

This is because as the degradation degree of the three-way catalyst 16 is higher, the consumption amount of reducing agent in the three-way catalyst 16 decreases to increase the actual supply amount of reducing agent to the NOx catalyst 17, and the table is so configured with a view to terminating the rich spike earlier according to the increase in the actual supply amount of reducing agent. Then, in the step 9 in FIG. 3, the reducing agent amount reference value S_QDAREF is multiplied by the thus set first degradation-dependent correction coefficient KDEGRA1, and is then compared with the cumulative value S_QDAL of the reducing agent supply amount, so that as the degree of degradation of the three-way catalyst 16 is higher, the timing for terminating the rich spike is advanced.

In a step following the step 59, the degradation estimation completion flag F_DONE is set to 1 to indicate that the estimation of the degree of degradation of the three-way catalyst 16 is completed, followed by terminating the present process.

Figure 13:
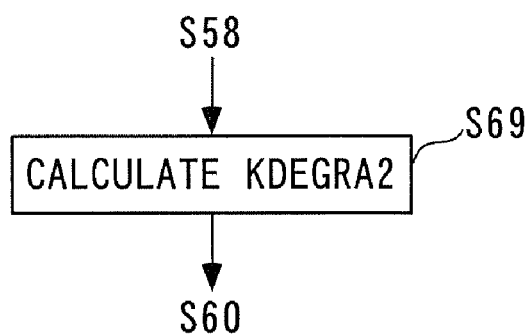
FIG. 13 is a flowchart showing a part of a variation of the process for estimating degradation of the three-way catalyst.
Figure 14:
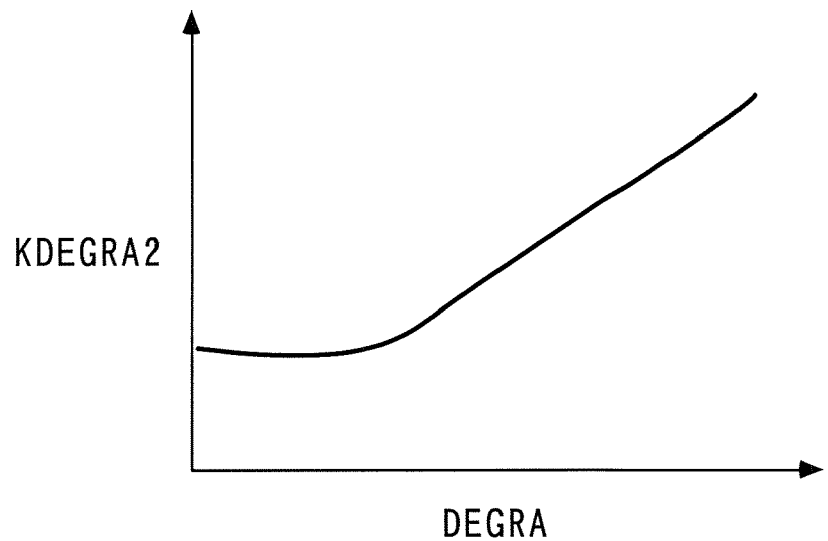
FIG. 14 is a diagram showing an example of a KDEGR2 table for use in the FIG. 13 process.
Figure 15:
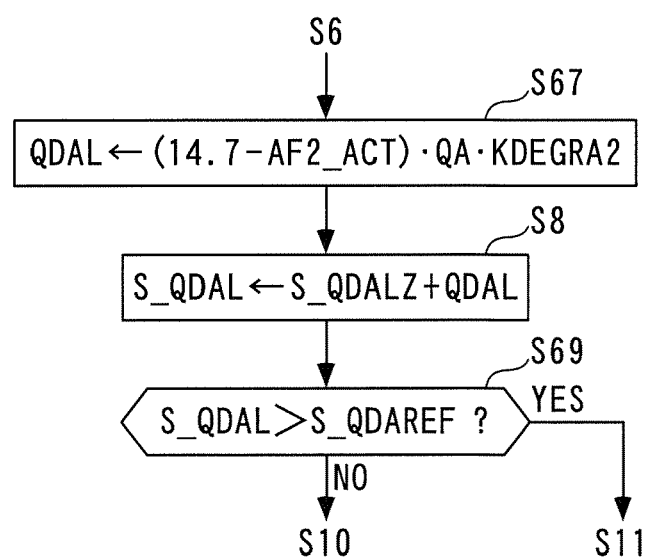
FIG. 15 is a flowchart showing a rich spike execution-determining process executed by an exhaust emission control device according to a variation of the first embodiment.

FIGS. 13 to 15 show a variation of the degradation-dependent correction executed according to the degradation degree DEGRA of the three-way catalyst. According to this variation, a second degradation-dependent correction coefficient KDEGRA2 calculated according to the degradation degree DEGRA is used for correction of the reducing agent supply amount QDAL.

FIG. 13 shows only a part of the present degradation estimating process, which is modified from the FIG. 9 process. That is, in place of the first degradation-dependent correction coefficient KDEGRA1, the second degradation-dependent correction coefficient KDEGRA2 is calculated in a step 69 in the degradation estimation process similar to the FIG. 9 process, after calculating the degradation degree DEGRA of the three-way catalyst 16 in the step 58.

The second degradation-dependent correction coefficient KDEGRA2 is calculated using a table shown in FIG. 14, in which the second degradation-dependent correction coefficient KDEGRA2 is set to a larger value as the degradation degree DEGRA is higher. This is because as the degree of degradation of the three-way catalyst 16 is higher, the consumption amount of reducing agent in the three-way catalyst 16 decreases to increase the actual supply amount of reducing agent to the NOx catalyst 17, and hence the table is so configured with a view to calculating the reducing agent supply amount QDAL as a larger value.

FIG. 15 shows only a part of the present rich spike execution-determining process, which is modified from the FIG. 3 process. In a step 67 following the step 6, the reducing agent supply amount QDAL is calculated by multiplying the product ($=(14.7-AF2\_ACT) \cdot QA$) of the difference between 14.7 representative of a stoichiometric air-fuel ratio and the second actual air-fuel ratio AF2_ACT and the intake air amount QA by the second degradation-dependent correction coefficient KDEGRA2.

Next, the cumulative value S_QDAL of the reducing agent supply amount is calculated in the step 7 similarly to the FIG. 3 process, and then in a step 69, it is determined whether or not the cumulative value S_QDAL of the reducing agent supply amount is larger than the reducing agent amount reference value S_QDAREF. Then, if the answer to this question is affirmative (YES), i.e. if S_QDAL>S_QDAREF holds, the process proceeds to the step 11 et seq. to terminate the rich spike.

As described above, according to this variation, the second degradation-dependent correction coefficient KDEGRA2 is set to a larger value as the degradation degree DEGRA of the three-way catalyst 16 is higher, and the thus set second degradation-dependent correction coefficient KDEGRA2 is applied to the calculation of the reducing agent supply amount QDAL, whereby as the degradation degree of the three-way catalyst 16 is higher, the timing for terminating the rich spike is advanced.

Figure 16:
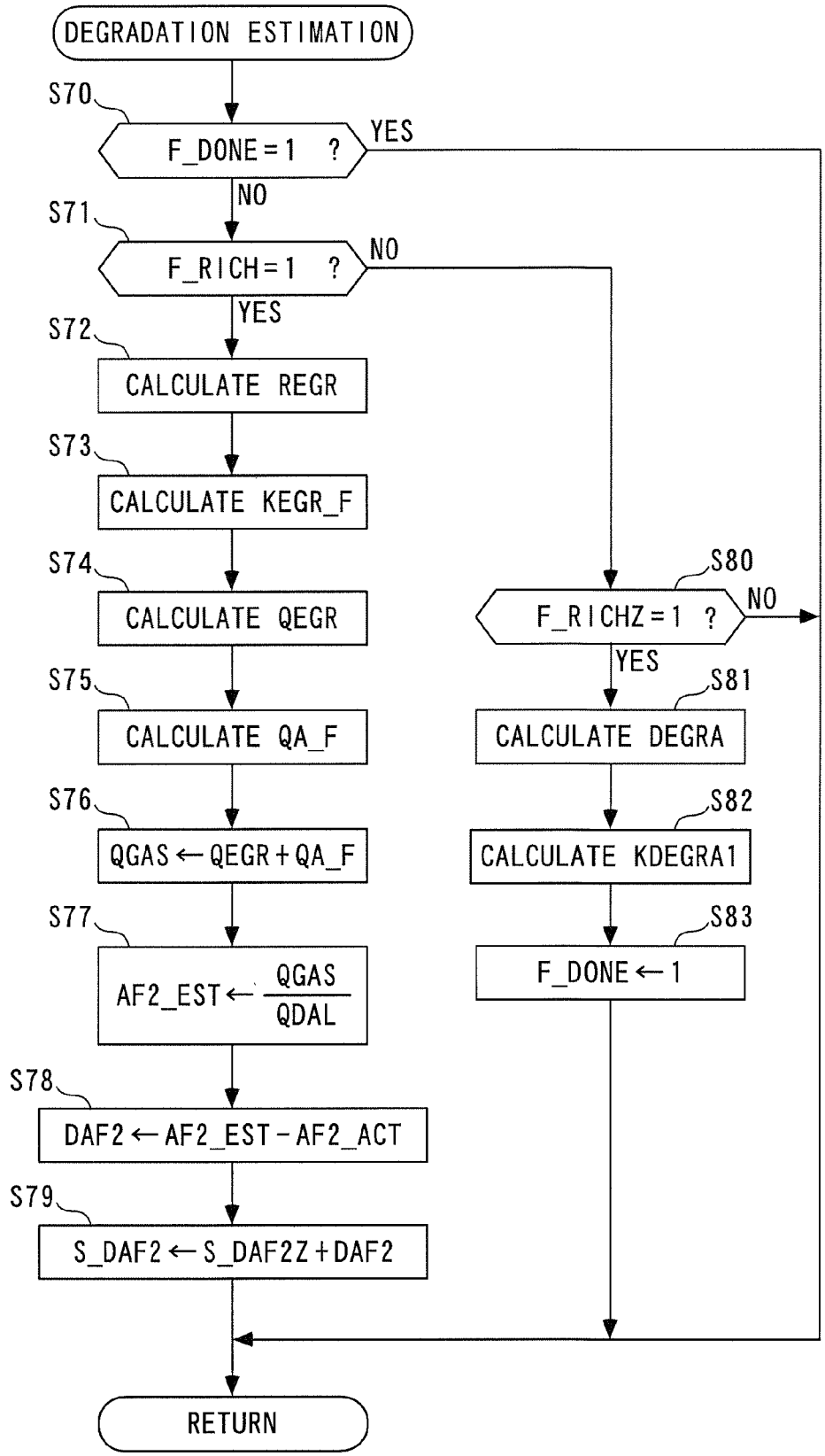
FIG. 16 is a flowchart showing a process for estimating degradation of the three-way catalyst, which is executed by an exhaust emission control device according to a second embodiment of the present invention.

FIG. 16 shows a process for estimating degradation of the three-way catalyst 16 according to a second embodiment of the present invention. According to this process, the air-fuel ratio of exhaust gases at a location downstream of the three-way catalyst 16 is estimated, and from the relationship between the estimated second estimated air-fuel ratio AF2_EST and the second actual air-fuel ratio AF2_ACT detected by the second LAF 34, the degradation degree DEGRA of the three-way catalyst 16 is estimated.

In this process, first, it is determined whether or not the degradation estimation completion flag F_DONE is equal to 1 (step 70). If the answer to this question is affirmative (YES), i.e. if the estimation of the degradation degree of the three-way catalyst 16 has already been completed, the present process is immediately terminated.

On the other hand, if the answer to the question of the step 70 is negative (NO), it is determined whether or not the rich spike flag F_RICH is equal to 1 (step 71). If the answer to this question is affirmative (YES), i.e. if the rich spike control is being executed, the process proceeds to a step 72, wherein an EGR rate REGR is calculated by searching a table (not shown) according to a duty ratio DUTY_RICH for the rich spike. The duty ratio DUTY_RICH for the rich spike represents the duty ratio of a drive signal supplied to the EGR control valve 14b during the rich spike control.

Then, a filtered value REGR_F of the ERG ratio is calculated by subjecting the calculated EGR rate REGR to the first-order lag filtering (step 73). The filtered value REGR_F of the EGR rate is used so as to cause a dead time it takes for combustion gases burned in the combustion chamber 3c to reach the NOx catalyst 17 in the exhaust pipe 5 to be reflected on the calculation.

Next, the EGR amount QEGR is calculated using the calculated EGR rate filtered value REGR_F and the intake air amount QA by the following equation (step 74):

$$QEGR = QA \times KEGR\_F/(1-KEGR\_F) \qquad (1)$$

Then, the process proceeds to a step 75, wherein a filtered value QA_F of the intake air amount is calculated by subjecting the intake air amount QA to first-order lag filtering. The filtered value QA_F of the intake air amount QA is used so as to cause the dead time it takes for the combustion gases burned in the combustion chamber 3c to reach the NOx catalyst 17 in the exhaust pipe 5 to be reflected on the calculation.

Next, the process proceeds to a step 76, wherein a total gas amount QGAS is set to the sum QGAS+QA_F of the EGR amount and the filtered value of the intake air amount. The total gas amount QGAS corresponds to an estimated value of the amount of exhaust gases actually supplied to the NOx catalyst 17.

In a step 77 following the step 76, the second estimated air-fuel ratio AF2_EST is set to a value ($=QGAS/QDAL$) obtained by dividing the total gas amount QGAS by the reducing agent supply amount QDAL. Then, in a step 78, the difference AF2_EST−AF2_ACT between the second estimated air-fuel ratio and the second actual air-fuel ratio is calculated as the second air-fuel ratio difference DAF2.

Figure 17:
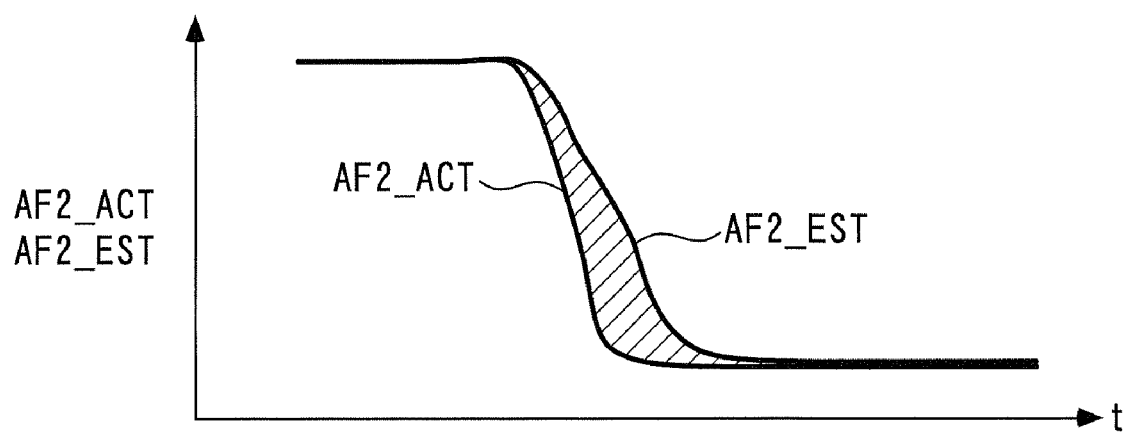
FIG. 17 is a schematic diagram showing a relationship between a second actual air-fuel ratio determined by the FIG. 16 process and a second estimated air-fuel ratio.

Next, in a step 79, the calculated second air-fuel ratio difference DAF2 is added to the preceding value S_DAF2Z of the cumulative value of the second air-fuel ratio difference to thereby calculate the cumulative value S_DAF2 of the second air-fuel ratio difference, followed by terminating the present process. The thus calculated cumulative value S_DAF2 of the second air-fuel ratio difference corresponds to the area of a region indicated by hatching in FIG. 17.

Figure 18:
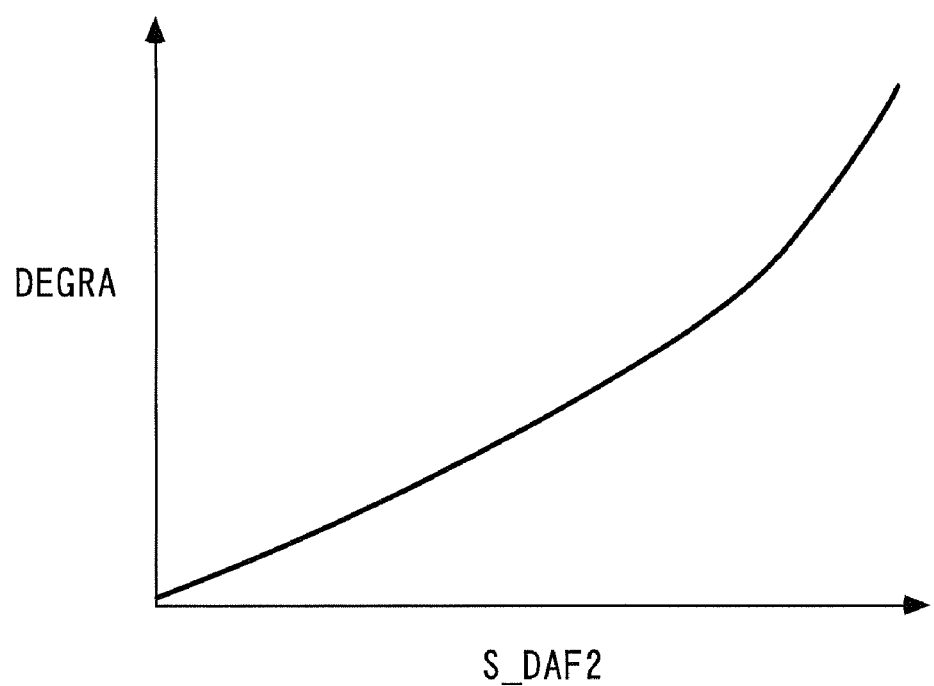
FIG. 18 is a diagram showing an example of a DEGRA table for use in the FIG. 16 process.

On the other hand, if the answer to the question of the step 71 is negative (NO), the process proceeds to a step 80, wherein it is determined whether or not the immediately preceding value F_RICHZ of the rich spike flag is equal to 1. If the answer to this question is negative (NO), the present process is immediately terminated, whereas if the answer to the question of the step 80 is affirmative (YES), i.e. if the step 80 is the first control timing after termination of the rich spike control, the process proceeds to a step 81, wherein the degradation degree DEGRA of the three-way catalyst 16 is calculated by searching a table shown in FIG. 18 according to the cumulative value S_DAF2 of the second air-fuel ratio difference calculated during the rich spike.

In this table, the degradation degree DEGRA is set to a larger value as the cumulative value S_DAF2 of the second air-fuel ratio difference is larger. This is because as the degradation degree DEGRA of the three-way catalyst 16 is higher, the oxygen storage capability and the oxidation capability of the three-way catalyst 16 decrease to terminate the oxidation reaction of reducing agent in earlier timing, causing the air-fuel ratio of exhaust gases at a location downstream of the catalyst to be changed to a richer side in earlier timing.

The details of the processing thereafter are the same as the steps 59 and 60 in FIG. 9, and the first degradation-dependent correction coefficient KDEGRA1 is calculated by searching the table shown in FIG. 12 according to the degradation degree DEGRA (step 82), and the degradation estimation completion flag F_DONE is set to 1 (step 83), followed by terminating the present process. The calculated first degradation-dependent correction coefficient KDEGRA1 is used for correcting the reducing agent amount reference value S_QDAREF in the step 9 in FIG. 3.

It should be noted that similarly to the variation shown in FIGS. 13 to 15, the second degradation-dependent correction coefficient KDEGRA2 may be determined by searching the table shown in FIG. 14 according to the degradation degree DEGRA of the three-way catalyst 16 estimated in the degradation estimation process in FIG. 16, and be used for correcting the reducing agent supply amount QDAL.

As described above, according to the present embodiment, the degradation degree DEGRA of the three-way catalyst 16 disposed upstream of the NOx catalyst 17 is estimated. Then, as the estimated degradation degree DEGRA is higher, the first degradation-dependent correction coefficient KDEGRA1 is set to a smaller value, and the reducing agent amount reference value S_QDAREF which is compared with the cumulative value S_QDAL of the reducing agent supply amount for determination of timing for terminating the rich spike is multiplied by the set first degradation-dependent correction coefficient KDEGRA1. Alternatively, as in the variation, as the estimated degradation degree DEGRA is higher, the second degradation-dependent correction coefficient KDEGRA2 is set to a larger value, and the reducing agent supply amount QDAL is multiplied by the set second degradation-dependent correction coefficient KDEGRA2.

Therefore, as the estimated degradation degree DEGRA of the three-way catalyst 16 is higher, the time period over which the rich spike should be executed is corrected to become shorter, which makes it possible to appropriately set the rich spike execution time period while causing the actual consumption amount of reducing agent dependent on the degradation degree of the three-way catalyst 16 to be reflected thereon, whereby a just enough amount of reducing agent can be supplied to the NOx catalyst 17. As a consequence, it is possible to reduce exhaust emissions and improve fuel economy without causing insufficient reduction of NOx or excessive generation of HC and CO.

Further, the degradation degree DEGRA of the three-way catalyst 16 is estimated according to the cumulative value S_DTTWC of the temperature difference calculated based on the difference between the downstream temperature TTWC2 and the upstream temperature TTWC1 detected during the rich spike, or according to the cumulative value S_DAF2 of the second air-fuel ratio difference calculated based on the difference between the second estimated air-fuel ratio AF2_EST and the second actual air-fuel ratio AF2_ACT, and therefore the estimation can be appropriately carried out.

It should be noted that the present invention is by no means limited to the above-described embodiments, but it can be practiced in various forms. For example, although in the embodiments, the estimation of the degradation degree DEGRA of the three-way catalyst 16 is carried out based on the relationship between the respective temperatures TTWC1 and TTWC2 upstream and downstream of the three-way catalyst 16 or based on the relationship between the second estimated air-fuel ratio AF2_EST and the second actual air-fuel ratio AF2_ACT of exhaust gases downstream of the three-way catalyst 16, this is not limitative, but any other suitable estimation method can be employed.

Further, although in the above-described embodiment, during the rich spike, the reducing agent is supplied by increasing the amount of fuel injected from the injector 6 into the combustion chamber 3c, this is not limitative, but another injector for supply of reducing agent may be disposed in the exhaust pipe 5 to thereby directly inject reducing agent into exhaust gases, by way of example. Further, although in the present embodiment, the catalyst upstream of the NOx catalyst 17 is implemented by a three-way catalyst, the catalyst may be any catalyst so long as it has at least oxidation function.

Furthermore, the present invention may be applied not only to the diesel engine installed on a vehicle but also to a diesel engine, such as a lean burn engine. Further, the present invention can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, for purifying exhaust gases discharged from the engine into an exhaust system, comprising:
   an upstream catalyst that is disposed in the exhaust system and has an oxidation function for purifying exhaust gases;
   a NOx catalyst that is disposed in the exhaust system at a location downstream of the upstream catalyst, for trapping NOx contained in exhaust gases in an oxidizing atmosphere, and reducing the trapped NOx in a reducing atmosphere to thereby purify the trapped NOx;
   NOx reduction control means for executing reduction control in which the exhaust gases flowing into said NOx catalyst are controlled to the reducing atmosphere, by supplying reducing agent to an upstream side of said upstream catalyst so as to cause said NOx catalyst to carry out an operation for reducing NOx;
   degradation degree-estimating means for estimating a degree of degradation of said upstream catalyst; and
   correction means for correcting a time period over which the reduction control should be executed by said NOx reduction control means, according to the estimated degree of degradation of said upstream catalyst,
   wherein said degradation degree-estimating means includes:
   upstream temperature-detecting means for detecting a temperature at a location upstream of said upstream catalyst;
   downstream temperature-detecting means for detecting a temperature at a location downstream of said upstream catalyst;
   catalyst temperature-detecting means for detecting a temperature of said upstream catalyst;
   rise degree-calculating means for calculating a degree of rise in the temperature at the location downstream of said upstream catalyst with respect to the temperature at the location upstream of said upstream catalyst, the temperature being detected during execution of the reduction control;
   temperature correction value-calculating means for calculating a temperature correction value such that as the detected temperature of said upstream catalyst is higher, the temperature correction value becomes larger; and calculating degree of rise in the detected downstream temperature of said upstream catalyst by subtracting the temperature correction value from a provisional degree of rise, and estimates the degree of degradation of said upstream catalyst such that as a cumulative degree of rise in the temperature is smaller, the degree of degradation becomes higher.

2. An exhaust emission control device as claimed in claim 1, wherein said NOx reduction control means includes:

reducing agent supply amount-calculating means for calculating a reducing agent supply amount indicative of an amount of reducing agent supplied to said NOx catalyst; and reduction control-terminating means for terminating the reduction control when the calculated reducing agent supply amount exceeds a threshold value, and wherein said correction means performs the correction such that as the estimated degree of degradation of said upstream catalyst is higher, the threshold value becomes smaller.

3. An exhaust emission control device as claimed in claim 1, wherein said NOx reduction control means includes:

reducing agent supply amount-calculating means for calculating a reducing agent supply amount indicative of an amount of reducing agent supplied to said NOx catalyst; and reduction control-terminating means for terminating the reduction control when the calculated reducing agent supply amount exceeds a threshold value, and wherein said correction means performs the correction such that as the estimated degree of degradation of said upstream catalyst is higher, the calculated reducing agent supply amount becomes larger.

4. An exhaust emission control device as claimed in claim 1, wherein said degradation degree-estimating means includes:

air-fuel ratio-estimating means for estimating an air-fuel ratio at a location downstream of said upstream catalyst, and air-fuel ratio-detecting means for detecting an air-fuel ratio at the location downstream of said upstream catalyst, and estimates the degree of degradation of said upstream catalyst according to a degree of delay of the detected air-fuel ratio with respect to the air-fuel ratio estimated during execution of the reduction control.

5. A method of purifying exhaust gases discharged from an internal combustion engine into an exhaust system thereof, the engine including the exhaust system, an upstream catalyst that is disposed in the exhaust system and has an oxidation function for purifying exhaust gases, and a NOx catalyst that is disposed in the exhaust system at a location downstream of the upstream catalyst, for trapping NOx contained in exhaust gases in an oxidizing atmosphere, and reducing the trapped NOx in a reducing atmosphere to thereby purify the trapped NOx, the method comprising:

a NOx reduction control step of executing reduction control in which the exhaust gases flowing into the NOx catalyst is controlled to the reducing atmosphere, by supplying reducing agent to an upstream side of the upstream catalyst so as to cause the NOx catalyst to carry out an operation for reducing NOx;

a degradation degree-estimating step of estimating a degree of degradation of the upstream catalyst; and a correction step of correcting a time period over which the reduction control should be executed in said NOx reduction control step, according to the estimated degree of degradation of the upstream catalyst, wherein said degradation degree-estimating step includes:

an upstream temperature-detecting step of detecting a temperature at a location upstream of the upstream catalyst;

a downstream temperature-detecting step of detecting a temperature at a location downstream of the upstream catalyst;

a catalyst temperature-detecting step of detecting a temperature of said upstream catalyst;

a rise degree-calculating step of calculating a degree of rise in the temperature at the location downstream of said upstream catalyst with respect to the temperature at the location upstream of said upstream catalyst, the temperature being detected during execution of the reduction control;

a temperature correction value-calculating step of calculating a temperature correction value such that as the detected temperature of said upstream catalyst is higher, the temperature correction value becomes larger; and calculating degree of rise in the detected downstream temperature of said upstream catalyst by subtracting the temperature correction value from a provisional degree of rise, and wherein the degree of degradation of said upstream catalyst is estimated such that as a cumulative degree of rise in the temperature is smaller, the degree of degradation becomes higher.

6. A method as claimed in claim 5, wherein said NOx reduction control step includes:

a reducing agent supply amount-calculating step of calculating a reducing agent supply amount indicative of an amount of reducing agent supplied to the NOx catalyst; and a reduction control-terminating step of terminating the reduction control when the calculated reducing agent supply amount exceeds a threshold value, and wherein said correction step includes performing the correction such that as the estimated degree of degradation of the upstream catalyst is higher, the threshold value becomes smaller.

7. A method as claimed in claim 5, wherein said NOx reduction control step includes:

a reducing agent supply amount-calculating step of calculating a reducing agent supply amount indicative of an amount of reducing agent supplied to the NOx catalyst; and a reduction control-terminating step of terminating the reduction control when the calculated reducing agent supply amount exceeds a threshold value, and wherein said correction step includes performing the correction such that as the estimated degree of degradation of the upstream catalyst is higher, the calculated reducing agent supply amount becomes larger.

8. A method as claimed in claim 5, wherein said degradation degree-estimating step includes:

an air-fuel ratio-estimating step of estimating an air-fuel ratio at a location downstream of the upstream catalyst, and an air-fuel ratio-detecting step of detecting an air-fuel ratio at the location downstream of the upstream catalyst, and includes estimating the degree of degradation of the upstream catalyst according to the degree of delay of the detected air-fuel ratio with respect to the air-fuel ratio estimated during execution of the reduction control.

9. An engine control unit including a control program for causing a computer to execute a method of purifying exhaust gases discharged from an internal combustion engine into an exhaust system thereof, the engine including the exhaust system, an upstream catalyst that is disposed in the exhaust system and has an oxidation function for purifying exhaust gases, and a NOx catalyst that is disposed in the exhaust system at a location downstream of the upstream catalyst, for trapping NOx contained in exhaust gases in an oxidizing atmosphere, and reducing the trapped NOx in a reducing atmosphere to thereby purify the trapped NOx, wherein the control program causes the computer to execute reduction control in which the exhaust gases flowing into the NOx catalyst is controlled to the reducing atmosphere, by supplying reducing agent to an upstream side of the upstream catalyst so as to cause the NOx catalyst to carry out an operation for reducing NOx, estimate a degree of degradation of the upstream catalyst, and correct a time period over which the reduction control should be executed, according to the estimated degree of degradation of the upstream catalyst, and wherein the control program causes the computer to detect a temperature at a location upstream of the upstream catalyst, detect a temperature at a location downstream of the upstream catalyst, detect a temperature of said upstream catalyst, calculate a degree of rise in the temperature at the location downstream of said upstream catalyst with respect to the temperature at the location upstream of said upstream catalyst, the temperature being detected during execution of the reduction control, calculate a temperature correction value such that as the detected temperature of said upstream catalyst is higher, the temperature correction value becomes larger;

calculating degree of rise in the temperature by subtracting the temperature correction value from a provisional of rise, and estimate a degree of degradation of said upstream catalyst such that as a cumulative degree of rise in the temperature is smaller, the degree of degradation becomes higher.

10. An engine control unit method as claimed in claim 9, wherein the control program causes the computer to calculate a reducing agent supply amount indicative of an amount of reducing agent supplied to the NOx catalyst, terminate the reduction control when the calculated reducing agent supply amount exceeds a threshold value, and perform the correction such that as the estimated degree of degradation of the upstream catalyst is higher, the threshold value becomes smaller.

11. An engine control unit as claimed in claim 9, wherein the control program causes the computer to calculate a reducing agent supply amount indicative of an amount of reducing agent supplied to the NOx catalyst, terminate the reduction control when the calculated reducing agent supply amount exceeds a threshold value, and perform the correction such that as the estimated degree of degradation of the upstream catalyst is higher, the calculated reducing agent supply amount becomes larger.

12. An engine control unit as claimed in claim 9, wherein the control program causes the computer to estimate an air-fuel ratio at a location downstream of the upstream catalyst, detect an air-fuel ratio at the location downstream of the upstream catalyst, and estimate the degree of degradation of the upstream catalyst according to the degree of delay of the detected air-fuel ratio with respect to the air-fuel ratio estimated during execution of the reduction control.

* * * * *